(12) United States Patent
Misawa

(10) Patent No.: US 12,120,511 B2
(45) Date of Patent: Oct. 15, 2024

(54) COMMUNICATION SYSTEM TRANSMITTING ENCRYPTED DATA

(71) Applicants: KABUSHIKI KAISHA TOSHIBA, Tokyo (JP); Toshiba Infrastructure Systems & Solutions Corporation, Kawasaki (JP)

(72) Inventor: Yuto Misawa, Kawasaki (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 501 days.

(21) Appl. No.: 17/464,189

(22) Filed: Sep. 1, 2021

(65) Prior Publication Data

US 2021/0400484 A1 Dec. 23, 2021

Related U.S. Application Data

(63) Continuation of application No. PCT/JP2020/008472, filed on Feb. 28, 2020.

(30) Foreign Application Priority Data

Mar. 4, 2019 (JP) .................... 2019-038375

(51) Int. Cl.
*H04W 12/06* (2021.01)
*H04W 12/037* (2021.01)
(Continued)

(52) U.S. Cl.
CPC ....... *H04W 12/069* (2021.01); *H04W 12/037* (2021.01); *H04W 12/041* (2021.01); *H04W 12/0471* (2021.01)

(58) Field of Classification Search
CPC ............ H04W 12/069; H04W 12/037; H04W 12/041; H04W 12/0471; H04W 12/03;
(Continued)

(56) References Cited

U.S. PATENT DOCUMENTS 7,983,656 B2 * 7/2011 Nguyen ................ H04W 12/03
455/433
2005/0135268 A1   6/2005 Simon et al.
(Continued)

FOREIGN PATENT DOCUMENTS

JP   2005-184835 A   7/2005
JP   2007-535203 A   11/2007
(Continued)

OTHER PUBLICATIONS

International Search Report issued Jun. 2, 2020 in PCT/JP2020/008472, filed on Feb. 28, 2020, 2 pages.
(Continued)

*Primary Examiner* — Harunur Rashid
(74) *Attorney, Agent, or Firm* — Maier & Maier, PLLC

(57) ABSTRACT

According to an embodiment, a communication system includes a plurality of first communication control devices and a second communication control device. The first communication control devices each includes a wireless communication unit and a controller. When receiving data to be transmitted from the first device to the second device, the controller determines a communication path in the mesh network for transmission of the data to the network communication network from the first communication control device that receives the data, performs mutual authentication with the second communication control device communicating via the communication path and the network com-
(Continued)

munication network, and thereafter transmits encrypted data obtained by encrypting the data to the second communication control device.

2 Claims, 7 Drawing Sheets

(51) Int. Cl.
  *H04W 12/041* (2021.01)
  *H04W 12/0471* (2021.01)
  *H04W 12/069* (2021.01)
(58) Field of Classification Search
  CPC . H04L 63/166; H04L 2209/80; H04L 9/0891; H04L 9/3263; H04L 9/3273; G06F 21/445
  See application file for complete search history.

(56) References Cited

U.S. PATENT DOCUMENTS

| | | |
|---|---|---|
| 2007/0258508 A1 | 11/2007 | Werb et al. |
| 2010/0191968 A1 | 7/2010 | Patil et al. |
| 2011/0231649 A1* | 9/2011 | Bollay ............... H04L 63/0884 |
| | | 713/153 |
| 2014/0122865 A1* | 5/2014 | Ovsiannikov ......... H04L 63/168 |
| | | 713/151 |
| 2015/0143456 A1* | 5/2015 | Raleigh ................. H04L 63/20 |
| | | 726/1 |
| 2015/0372875 A1* | 12/2015 | Turon ................ H04W 12/041 |
| | | 370/254 |
| 2020/0204549 A1 | 6/2020 | Tomoeda et al. |

FOREIGN PATENT DOCUMENTS

| | | | |
|---|---|---|---|
| JP | 2009-117887 A | 5/2009 | |
| JP | 2012-516647 A | 7/2012 | |
| JP | 2017-503414 A | 1/2017 | |
| JP | 2018-42246 A | 3/2018 | |
| JP | 2019-50485 A | 3/2019 | |
| JP | 2020-123785 A | 8/2020 | |
| WO | WO-02067532 A1 * | 8/2002 | ......... H04L 63/0428 |

OTHER PUBLICATIONS

Search Report and Written Opinion issued on Dec. 26, 2022, in corresponding Singaporean Application No. 11202109230Q, 8 pages.

Frankel et al., "IP Security (IPsec) and Internet Key Exchange (IKE) Document Roadmap", Internet Engineering Task Force (IETF), Feb. 2011, 63 pages.

* cited by examiner

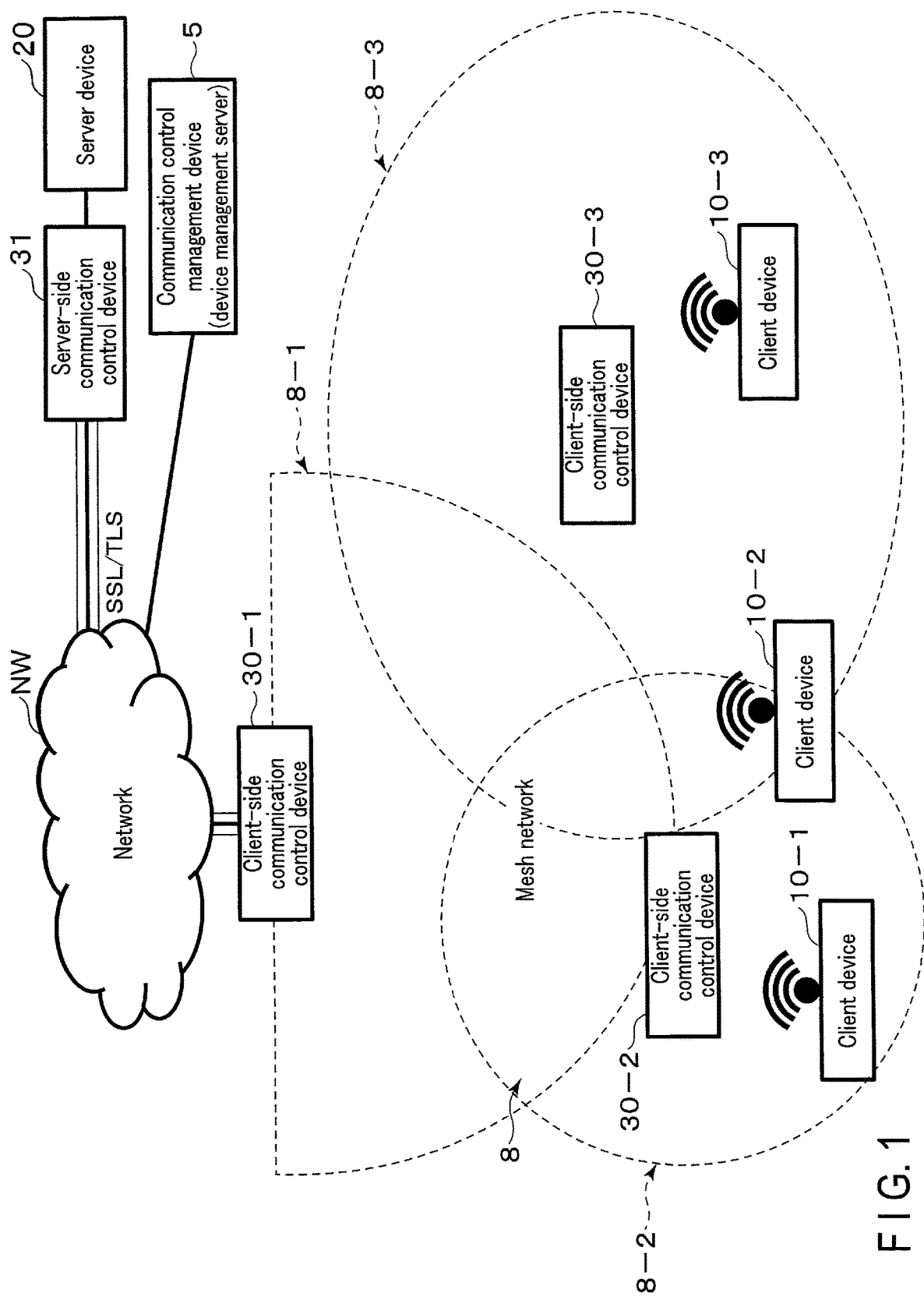
F I G. 1

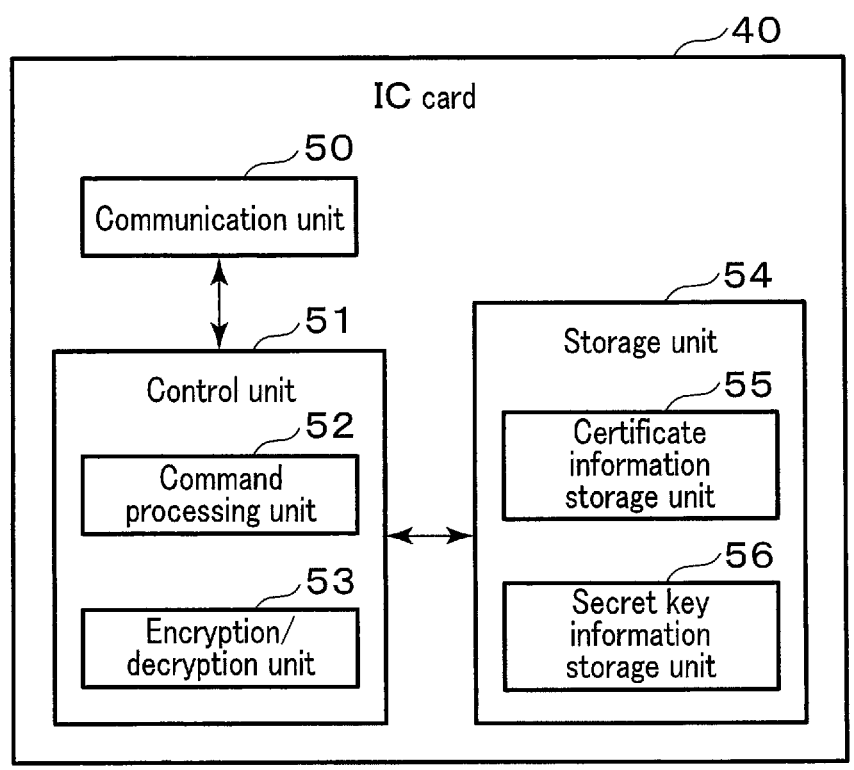
F I G. 5

COMMUNICATION SYSTEM TRANSMITTING ENCRYPTED DATA

CROSS REFERENCE TO RELATED APPLICATIONS

This application is a Continuation Application of PCT Application No. PCT/JP2020/008472, filed Feb. 28, 2020 and based upon and claiming the benefit of priority from Japanese Patent Application No. 2019-038375, filed Mar. 4, 2019, the entire contents of all of which are incorporated herein by reference.

FIELD

Embodiments described herein relate generally to a communication system.

BACKGROUND

In a communication system, data to be handled and equipment control information require protection from a malware attack or the like. For example, equipment such as a monitoring camera installed as a social infrastructure needs to ensure the security of data to be communicated. However, it is difficult to frequently replace equipment constituting the social infrastructure such as a monitoring camera post-installation, giving rise to the problem that the security measures may be insufficient.

CITATION LIST

PATENT LITERATURE 1: Jpn. Pat. Appln. KOKAI Publication No. 2009-117887

SUMMARY

Technical Problem

An object of the present invention is to provide a communication system capable of improving the security of communication used in a social infrastructure system or the like.

Solution to Problem

According to an embodiment, a communication system includes a plurality of first communication control devices and a second communication control device. The first communication control devices each includes a wireless communication unit and a controller. The wireless communication unit performs wireless communication. When receiving data to be transmitted via the wireless communication unit from the first device to the second device, the controller determines a communication path in the mesh network for transmission of the data to the network communication network from the first communication control device that receives the data, performs mutual authentication with the second communication control device communicating via the communication path and the network communication network, and thereafter transmits encrypted data obtained by encrypting the data to the second communication control device.

BRIEF DESCRIPTION OF THE DRAWINGS

FIG. 1 is a diagram showing an example of a basic configuration of a communication system according to an embodiment.

FIG. 5 is a block diagram showing an example of a functional configuration of an IC card as a configuration example of an authentication unit in the communication control device according to an embodiment.

DETAILED DESCRIPTION

Figure 2:
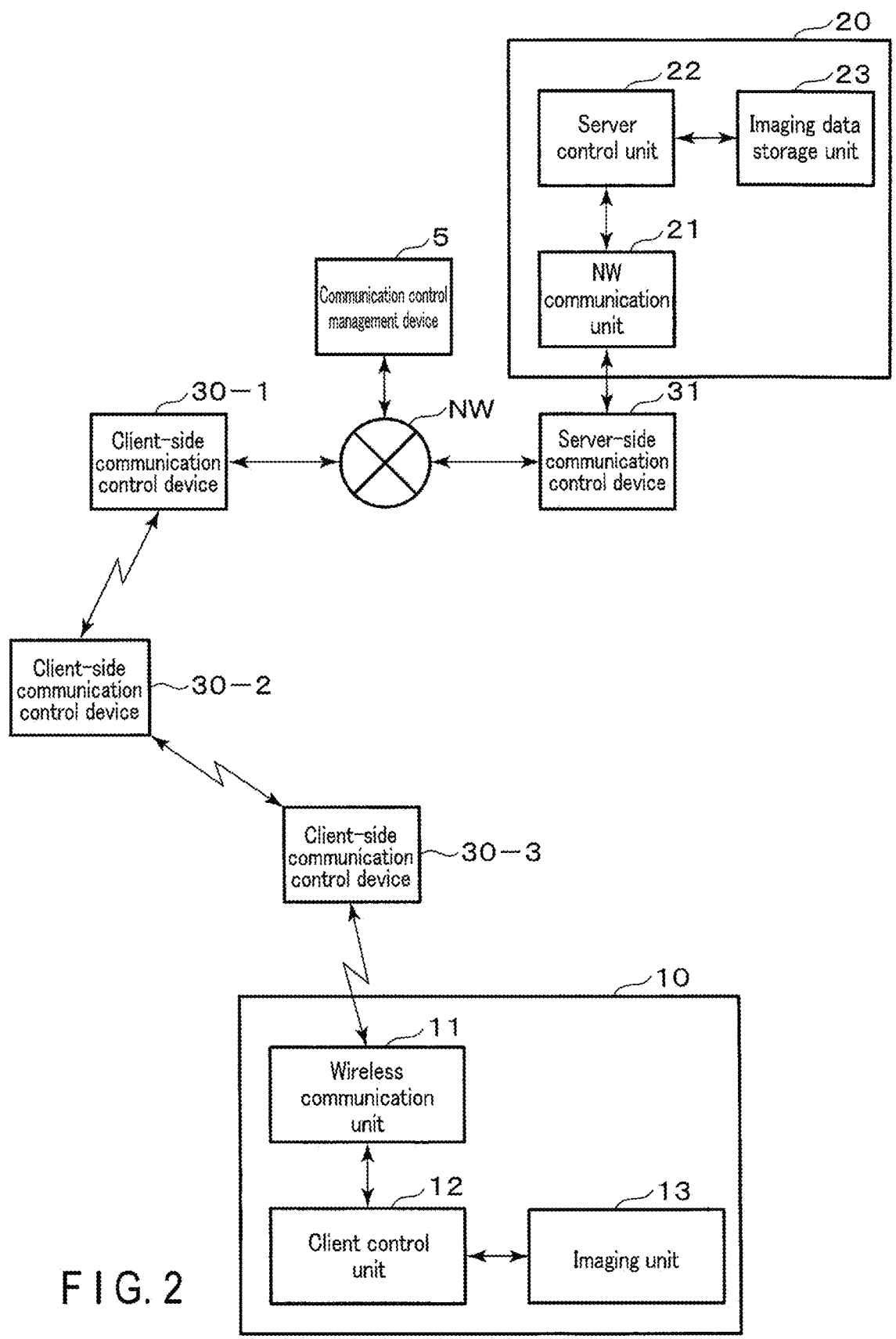
FIG. 2 is a block diagram showing an example of configurations of a client device and a server device according to an embodiment.

Hereinafter, each embodiment will be described with reference to the drawings.

First, a basic configuration example and an operation example serving as a base of a communication system according to each embodiment will be described.

FIG. 1 is a diagram showing a configuration example of a communication system 1 having a basic configuration of the communication system according to each embodiment.

The communication system 1 includes a client device (an example of a first device) 10 (10-1 to 10-N), a server device (an example of a second device) 20, client-side communication control devices 30 (30-1 to 30-N) (an example of "first communication control device"), a server-side communication control device 31 (an example of "second communication control device"), a communication control management device 5 (an example of "private authentication authority"), and a network NW.

The client device 10 is connected to the network NW via the client-side communication control device 30. The server device 20 is connected to the network NW via the server-side communication control device 31. Details of the configurations of the client device 10 and the server device 20 will be described later.

The client device 10 wirelessly communicates with the client-side communication control device 30. Wireless communication includes communication utilizing, for example, a Wi-Fi (registered trademark) network or Bluetooth (registered trademark). The client-side communication control devices 30 perform wireless communication with one another. The client-side communication control devices 30 are wirelessly connected with one another, thereby constituting a mesh network 8. The mesh network 8 is not limited to a network in a wide space, but is constituted as a network used in a case where a plurality of client devices are disposed in a plurality of floors in either a building or an environment including a number of shields, to reliably transmit data from each of the client devices.

The mesh network 8 is a communication area covered by a wireless communication area 8-1, 8-2, or 8-3 of each client-side communication control device 30. For example, each client-side communication control device 30 realizes a mesh network compliant with IEEE802.11s or the like. The mesh network 8 is constructed to enable wireless communication with all client devices 10 that are subjects of control. Using a protocol, such as mesh IEEE802.11s, wireless communication between a client-side communication control device 30 and another communication control device 30 in the mesh network 8 can realize a wireless security network with improved availability and secrecy.

The client-side communication control device 30 has the function of operating as a gateway/access point (GW/AP). The client-side communication control device 30 retains a key and a certificate corresponding to the client devices 10 in the mesh network. Accordingly, each communication control device 30 performs authentication for the client devices 10. Each client device 10 retains settings for performing wireless communication with the corresponding client-side communication control device 30 constituting the mesh network. For example, in each client device 10, an SSID as its own identification information and a password for use in authentication, such as WPA, are set.

The client-side communication control device 30 mediates communication between the client device 10 and the server device 20 via the mesh network 8 connected between the client device 10 and the network NW. Thus, the client-side communication control device 30 constituting the mesh network 8 acquires data transmitted by the client device 10 to the server device 20, and outputs the acquired data to the server device 20. Here, when data is transmitted to the server device 20, the client-side communication control device 30 encrypts data acquired from the client device 10 and transmits the encrypted data to the server device 20.

The client-side communication control device 30 constituting the mesh network 8 acquires data transmitted by the server device 20 to the client device 10, and outputs the acquired data to the client device 10. Here, the data acquired by the client-side communication control device 30 is encrypted data. When data is output to the client device 10, the client-side communication control device 30 decrypts the data acquired from the server device 20 via the server-side communication control device 31 and outputs the decrypted data to the client device 10.

In the communication system 1, one of the client-side communication control devices 30 is connected to the network NW by wire communication. In the configuration example shown in FIG. 1, the communication control device 30-1 is connected to the network NW and communicates with the server-side communication control device 31 via the network NW. In the mesh network 8, the communication control devices 30-2, . . . 30N, other than the communication control device 1, need not have a communication unit to be connected to the network NW, but may have a communication unit to be connected to another communication control device and the client device 10 wirelessly.

One of the client-side communication control devices 30 may be connected to one client device 10 via a cable for wire communication, such as an Ether cable. By connecting one of the client-side communication control devices 30 to one client device via a wire, changes to settings on the side of not only the client device 10 but also the client-side communication control device 30 can be reduced.

The server-side communication control device 31 is connected between the server device 20 and the network NW and mediates communication between the client device 10 and the server device 20. The server-side communication control device 31 acquires data transmitted from the server device 20 to the client device 10 and transmits the acquired data to the client device 10. Here, when data is transmitted to the client device 10, the server-side communication control device 31 encrypts the data acquired from the server device 20 and transmits the encrypted data to the client device 10.

The server-side communication control device 31 acquires data transmitted by the client device 10 to the server device 20 and outputs the acquired data to the server device 20. Here, the data acquired by the server-side communication control device 31 is encrypted data. When data is output to the server device 20, the server-side communication control device 31 decrypts the data acquired from the client device 10 via the client-side communication control device 30 constituting the mesh network 8, and outputs the decrypted data to the server device 20.

In the data encryption performed by the client-side communication control device 30 and the server-side communication control device 31, encryption based on, for example, a secure socket layer (SSL)/transport layer security (TLS) protocol, is performed. For example, the client-side communication control device 30 and the server-side communication control device 31 combine the SSL/TLS protocol with an HTTP to encrypt data included in the HTTP and to replace the encrypted data with that of HTTP secure (HTTPS) in which security is improved.

The data encryption performed by the client-side communication control device 30 and the server-side communication control device 31 is not limited to a change of the HTTP to the HTTPS. The client-side communication control device 30 and the server-side communication control device 31 may replace the SSL/TLS protocol with a secure communication protocol for improving security by combining the SSL/TLS protocol with various communication protocols. For example, the client-side communication control device 30 and the server-side communication control device 31 may replace a file transfer protocol (FTP) with FTP secure (FTPS).

In the communication system 1, the data encrypted by the client-side communication control device 30 or the server-side communication control device 31 is output to the network NW. In other words, in the communication system 1, data flowing through the network NW is encrypted data. Thus, it is possible to avoid a risk that data transmitted/received through the network NW is maliciously accessed from the outside and the data is intercepted, thereby improving security. The term "data interception" here means an "act of stealing a glance at data" or an "act of extracting data".

The communication control management device 5 is a device management server for managing the client-side communication control devices 30 and the server-side communication control device 31. For example, the communication control management device 5 issues a client certificate and a secret key to the client-side communication control device 30. In the configuration example shown in FIG. 1, the communication control management device 5 issues a client certificate and a secret key to be stored in an IC card which is attached to the client-side communication control device 30. Further, the communication control management device 5 transmits via the network NW the client certificate and the secret key to be stored in the IC card to the client-side communication control device 30 to which the IC card is attached.

The communication control management device 5 issues a server certificate and a secret key to the server-side communication control device 31. For example, the communication control management device 5 issues a server certificate and a secret key to be stored in the IC card.

Further, the communication control management device 5 transmits via the network NW the server certificate and the secret key to be stored in the IC card to the server-side communication control device 31 to which the IC card is attached. Each of the client certificate, the server certificate, and the secret key is information required to determine a common key (a session key) used when the client-side communication control device 30 and the server-side communication control device 31 perform encrypted communication Here, the configurations of the client device 10 and the server device 20 will be described. The client device 10 and the server device 20 are structural elements (components) that constitute a social infrastructure system. For example, the social infrastructure is a facility necessary for providing a social base such as a road traffic network, a power generation facility, a power distribution facility, a water treatment facility, or a gas distribution facility. The social infrastructure system is, for example, a mechanism for stably operating the social infrastructure by monitoring the social infrastructure, ascertaining a change in the situation, and coping with the change. In the following, an example in which the client device 10 and the server device are components of a monitoring system that monitors roads and public facilities will be described. In this case, the client device 10 is a device that transmits imaging data obtained by imaging a road condition or the like via the network NW (a network monitoring camera). The server device 20 is a device that receives the imaging data transmitted by the client device 10 via the network NW.

The client device 10 and the server device 20 are not limited to the components of the monitoring system. For example, the client device 10 and the server device may be components of a system that monitors a power situation in the power generation facility or the power distribution facility, or components of a system that acquires a distribution situation in a logistics center, a system that acquires an operation situation of a facility in a factory or research institution, or the like.

FIG. 2 is a block diagram showing an example of functional configurations of the client device 10 and the server device 20 shown in FIG. 1.

The client device 10 includes a wireless communication unit 11, a client control unit 12, and an imaging unit 13. The wireless communication unit 11 is a communication interface to wirelessly communicate with the client-side communication control devices 30 constituting the mesh network 8. The wireless communication unit 11 is a port that executes wireless communication, such as Wi-Fi or Bluetooth. The wireless communication unit 11 is connected to the client-side communication control device 30 wirelessly, and outputs data transmitted from the client device 10 to the server device 20 to the client-side communication control device 30

The client control unit 12 is, for example, a processor including a CPU and the like and generally controls the client device 10. For example, the client control unit 12 causes the imaging unit 13 to start or stop imaging or sets imaging conditions such as a direction of the camera that performs imaging with respect to the imaging unit 13 and a magnification at the time of imaging in accordance with control from the server device 20.

The imaging unit 13 images a landscape at a predetermined position in accordance with instructions of the client control unit 12. The imaging unit 13 outputs the imaged data (imaging data) to the client control unit 12.

The server device 20 includes a network (NW) communication unit 21, a server control unit 22, and an imaging data storage unit 23 The NW communication unit 21 is, for example, an Ethernet (registered trademark) port of the server device 20. The NW communication unit 21 is connected to the server-side communication control device 31 and outputs data to be transmitted from the server device 20 to the client device 10 to the server-side communication control device 31.

The server control unit 22 is, for example, a processor including a CPU and the like and generally controls the server device 20. For example, the server control unit 22 causes the imaging data storage unit 23 to store imaging data obtained through imaging performed by the client device 10. The imaging data storage unit 23 stores the imaging data in accordance with an instruction of the server control unit 22.

When the client device 10 and the server device 20 are connected to each other via the NW communication unit and the network NW, an HTTP, which is a general communication protocol in a network monitoring camera, may be used in the communication between the client device and the server device 20.

In this case, the client device 10 or the server device 20 outputs unencrypted information (so-called plain text). When a plain text is transmitted to the network NW, a third person with malicious intent may acquire the plain text data from the outside, triggering a risk of imaging data being easily intercepted or falsified. As a countermeasure against such an unauthorized attack, a case in which the client device 10 encrypts the imaging data and outputs the encrypted imaging data to the network NW is conceivable.

However, the client device such as a monitoring camera, which is already used in a social infrastructure, does not generally have sufficient resources to perform processing for encryption. As the client device is a component that constitutes a social infrastructure such as a monitoring camera, the hardware configuration cannot be easily changed or replaced. Therefore, in the communication system 1 according to the present embodiment, the client-side communication control device 30 arranged between the client device 10 and the network NW encrypts the data transmitted by the client device 10 and outputs the encrypted data to the network NW. The server-side communication control device 31 connected between the server device 20 and the network NW encrypts the control data transmitted by the server device 20 and outputs the encrypted control data to the network NW. This improves the security of the imaging data flowing through the network NW without changing the client device 10 and the server device 20.

Next, the functional configurations of the client-side communication control device 30 and the server-side communication control device 31 will be described.

Figure 3:
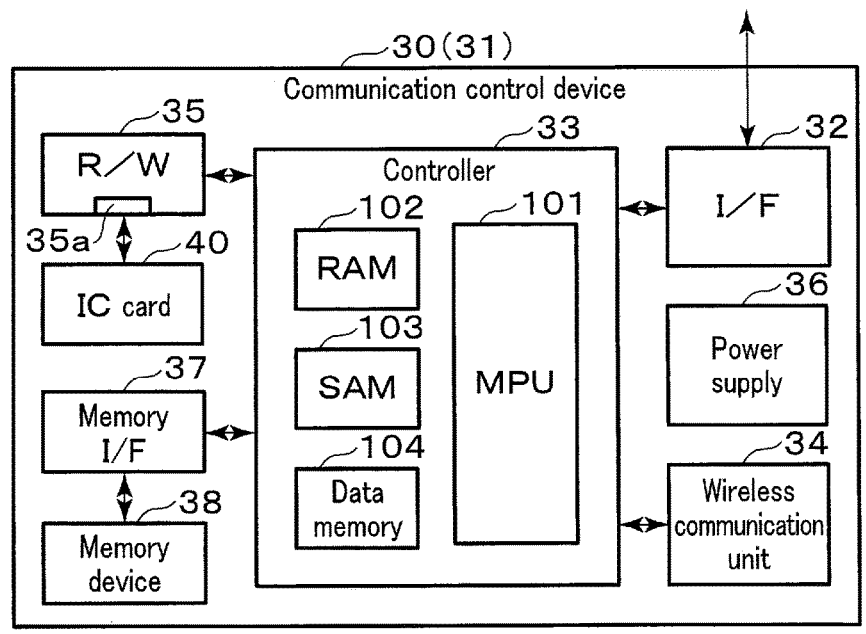
FIG. 3 is a block diagram showing an example of configurations of a client-side communication control device and a server-side communication control device according to an embodiment.

FIG. 3 is a block diagram showing an example of hardware configurations of the client-side communication control device 30 and the server-side communication control device 31 shown in FIG. 1. The client-side communication control device 30 includes a wireless communication unit which wirelessly communicates with the client device 10, and the server-side communication control device 31 includes a communication unit for communicating with the server device 20. Except for this point, the client-side communication control device 30 and the server-side communication control device 31 may have similar hardware configurations. The server-side communication control device 31 may include a wireless communication unit, and the client-side communication control device 30 may include a wired communication unit. Therefore, the client-side communication control device 30 and the server-side communication control device 31 may have the same hardware configurations. Thus, the hardware configuration of the client-side communication control device 30 will be described below and the description of the hardware configuration of the server-side communication control device 31 will be omitted. Hereinafter, when the client-side communication control device 30 and the server-side communication control device 31 are not distinguished from each other, they are simply referred to as the communication control device 30 (31) and the like.

As shown in FIG. 3, the communication control device (31) includes a network (NW) communication unit 32, a controller (control unit) 33, a wireless communication unit 34, a reader/writer 35, an IC card 40, a power supply 36, a memory I/F 37, and the like.

The controller 33 controls the communication control device 30 (31). In the configuration example shown in FIG. 3, the controller 33 includes an MPU 101, a RAM 102, a SAM 103, a data memory 104, and the like.

The MPU 101 is an example of a processor that controls the controller 33. The MPU 101 implements various processes by executing a program stored in the data memory 104 or the like. For example, through execution of the program by the MPU 101, the controller 33 executes processes such as communication control, trouble detection, communication failure detection, self-diagnosis, and log information collection.

In addition, through execution of the program by the MPU 101, the controller 33 may perform a mutual authentication process between the client-side communication control device 30 and the server-side communication control device 31, an encryption process of data to be transmitted from the client device 10 to the network NW, a decryption process of encrypted data to be transmitted to the client device 10 via the network NW, and the like. The controller 33 may request at least one of the mutual authentication process, the encryption process, and the decryption process to the IC card 40 connected via the reader/writer 105.

The RAM 102 is a random access memory. The RAM 102 functions as a working memory for holding working data. The SAM 103 is a serial access memory. The data memory 104 is a rewritable nonvolatile memory.

The data memory 104 stores a program, setting information, and the like. The data memory 104 may store log information indicating the operation state of the communication device. The log information accumulated in the data memory 104 is sent to the communication control management device (device management server) 5 or used for a self-diagnosis process or the like.

The data memory 104 stores a white list indicating that device is a valid system component. The white list stores a list of information on the client device 10 permitted to communicate, etc. For example, in an operation in which the client-side communication control device 30 authenticates the client device 10 in accordance with device-specific information, such as a MAC address, the data memory 104 stores as a white list the device-specific information of the client devices to which communication is permitted. For example, the controller 33 authenticates whether a device which communicates with the wireless communication unit 34 is a valid system component (client device) with reference to the white list. The controller 33 may rewrite the white list in the data memory 104 in response to an instruction from the communication control management device 5.

Furthermore, the data memory 104 stores keys and certificates corresponding to all system components (for example, the respective client devices 10) existing in the mesh network 8. The keys and certificates corresponding to the client devices 10 stored in the data memory 104 are used for authentication in SSL/TLS communication.

The data memory 104 also stores keys and certificates indicating that the respective communication control devices 30 constituting the mesh network 8 are valid. For example, the keys and certificates indicating that the respective communication control devices 30 stored in the data memory 104 are valid are used for mutual authentication between the communication control devices 30 in a communication path set in the mesh network 8.

The NW communication unit 32 executes communication on the network NW side in the communication control device 30 (31). However, the configuration of the NW communication unit 32 may be omitted from the client-side communication control devices 30 that do not directly communicate with the network NW (for example, the communication control devices 30-2 and 30-3 shown in FIG. 1). The NW communication unit 32 is assumed to be an interface to be connected to the network NW via a communication line. Alternatively, the NW communication unit 32 may communicate with the network NW wirelessly.

The wireless communication unit 34 is a communication interface which performs wireless communication with the client device 10 and other communication control devices 30. However, if the server-side communication control device 31 is not of a type that wirelessly communicates with the server device 20, it includes a server communication unit which performs communication with the server device 20 instead of the wireless communication unit 34.

The power supply 36 is connected to an external power supply, and supplies power from the external power supply to each unit in the communication control device 30 (31). The memory I/F 37 is an interface for setting a memory device 38 such as a memory card. For example, the memory device 38 storing information to be applied to the communication control device 30 (31), such as initial setting information, is set to the memory I/F 37. The memory device 38 set to the memory I/F 37 may store data, such as log data.

The client-side communication control device 30-1 connected to the network NW may be implemented as a system in which a plurality of communication devices having the same configuration as the communication control device 30 are arranged in parallel. Such a communication control device 30-1 is operated to execute communication processing by one of the communication devices, and when a trouble or communication failure occurs in the communication device executing the communication processing, the other communication device continues to execute the communication processing. Thus, one communication control device 30-1 connected to the network NW becomes redundant, and communication processing suffers no interruption even when a trouble or failure occurs, thereby improving the availability.

The client-side communication control device 30-1 connected to the network NW may be operated in a pass-through mode in which data is passed as is when a trouble or failure occurs in a device executing communication processing or power supplied to the power supply 36 is stopped (power interruption). Furthermore, when the communication control device 30-1 is in the pass-through mode, the other client-side communication control device 30 (30-2 or 30-3) may function as a client-side communication control device connected to the network NW. Such an operation control can be implemented by the communication control management device (device management server) 5 monitoring the operation state of each communication control device 30 and supplying an instruction for an operation mode or the like to each communication control device 30.

The reader/writer 35 is connected to the IC card 40 via a contact unit 35a and communicates with the IC card 40. Here, the IC card 40 is an example of an "authentication unit" that executes processing to be described later. The authentication unit is not limited to one implemented by the reader/writer 35 and the IC card 40. The authentication unit may be implemented by the control unit 33 or a processing circuit for authentication processing.

The IC card 40 is formed, for example, by mounting an IC module 41 that includes a contact unit 40a on a plastic card substrate. That is, the IC card 40 includes the IC module 41 and the card substrate in which the IC module 41 is embedded. The IC card 40 is attached to the communication control device 30 (31) so that the IC card 40 can be attached to or detached from the communication control device 30 (31) and can communicate with the communication control device 30 (31) via the contact unit 35a.

The IC card 40 receives, for example, a command (a processing request) transmitted by the communication control device 30 (31) via the contact unit 35a and the contact unit 40a, and executes a process (command processing) according to the received command. Then, the IC card 40 transmits a response (a processing response), which is an execution result of the command processing, to the contact unit 35a of the communication control device 30 (31) via the contact unit 40a.

The IC module 41 includes the contact unit 40a and an IC chip 42. The contact unit 40a has terminals for various types of signals necessary for the operation of the IC card 40. Here, the terminals for various types of signals include terminals for receiving a power supply voltage, a clock signal, a reset signal, and the like from the contact unit 35a of the communication control device 30 (31) and serial data input and output terminals (SIO terminals) for communicating with the communication control device 30 (31). For example, the IC chip 42 is large scale integration (LSI) such as a one-chip microprocessor.

Figure 4:
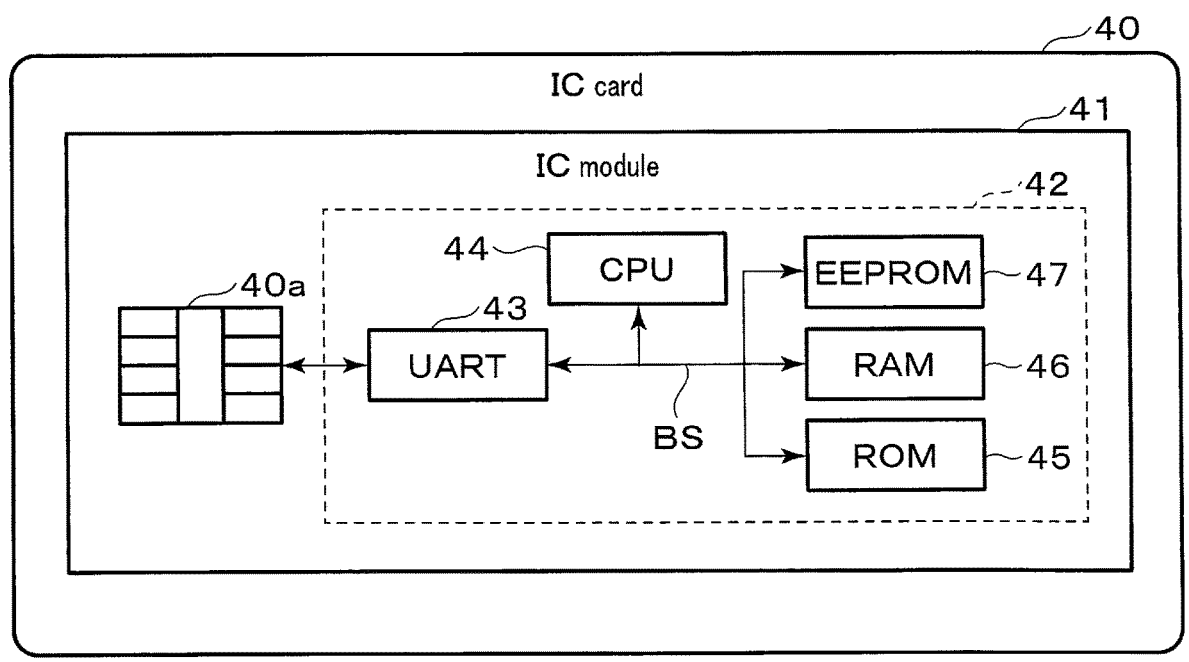
FIG. 4 is a diagram showing an example of a hardware configuration of an IC card as a configuration example of an authentication unit in the communication control device according to an embodiment.

Here, the hardware configuration of the IC card 40 will be described with reference to FIG. 4. FIG. 4 is a diagram showing an example of a hardware configuration of the IC card 40 shown in FIG. 3.

The IC card 40 includes the IC module 41 having the contact unit 40a and the IC chip 42. The IC chip 42 includes a universal asynchronous receiver transmitter (UART) 43, a CPU 44, a read only memory (ROM) 45, a random access memory (RAM) 46, and an electrically erasable programmable ROM (EEPROM (trademark)) 47. The respective components (43 to 47) are connected via an internal bus BS.

The UART 43 performs serial data communication with the communication control device 30 (31) via the SIO terminal described above. The UART 43 outputs data (for example, 1-byte data) obtained by converting the serial data signal received via the SIO terminal into parallel data to the internal bus BS. The UART 43 converts data acquired via the internal bus BS into serial data and outputs the serial data to the communication control device (31) via the SIO terminal. For example, the UART 43 receives a command from the communication control device 30 (31) via the SIO terminal. The UART 43 transmits a response to the communication control device 30 (31) via the SIO terminal.

The CPU 44 executes various types of processes of the IC card 40 by executing a program stored in the ROM 45 or the EEPROM 47. For example, the CPU 44 executes command processing according to the command received by the UART 43 via the contact unit 40a.

The ROM 45 is, for example, a non-volatile memory such as a mask ROM and stores data such as a program for executing various processes of the IC card 40 and a command table. The RAM 46 is, for example, a volatile memory such as a static RAM (SRAM) and temporarily stores data used when various types of processes of the IC card 40 are performed. The EEPROM 47 is, for example, an electrically rewritable nonvolatile memory. The EEPROM 47 stores various types of data used by the IC card 40. For example, the EEPROM 47 stores information used for various types of services (applications) using the IC card 40.

Next, the configuration of the IC card 40 will be described with reference to FIG. 5. FIG. 5 is a block diagram showing an example of a functional configuration of the IC card 40 shown in FIG. 4. The IC card 40 includes a communication unit 50, a control unit 51, and a storage unit 54. Here, each part of the IC card 40 shown in FIG. 5 is implemented using the hardware of the IC card 40 in FIG. 4.

The communication unit 50 is implemented by, for example, the UART 43, the CPU 44, and a program stored in the ROM 45, and, for example, transmits and receives a command and a response to and from the communication control device 30 (31) via the contact unit 40a. That is, the communication unit 50 receives a command (a processing request) for requesting a predetermined process from the communication control device 30 (31) and transmits a response (a processing response) to the command to the communication control device 30 (31). The communication unit 50 causes the RAM 46 to store received data received from the communication control device 30 (31) via the DART 43. The communication unit 50 transmits transmission data stored in the RAM 46 to the communication control device 30 (31) via the DART 43.

The control unit 51 is implemented by, for example, the CPU 44, the RAM 45, the ROM 46, or the EEPROM 47, and generally controls the IC card 40. The control unit 51 includes a command processing unit 52 and an encryption/decryption unit 53.

Here, a process to be performed by the command processing unit 52 is an example of an "authentication process". A process to be performed by the encryption/decryption unit 53 is an example of an "encryption/decryption process".

The command processing unit 52 executes various types of command processing. For example, the command processing unit 52 performs an SSL/TLS handshake as command processing for transmitting an HTTPS request to be described later. In the SSL/TLS handshake, key information necessary for encrypted communication and the like is exchanged and mutual authentication with a communication destination device is performed. Here, the mutual authentication is an authentication process in which the client-side communication control device 30 and the server-side communication control device 31 mutually check that they are devices that are properly authenticated before communication is performed.

The encryption/decryption unit 53 executes a process of encrypting data and a process of decrypting the encrypted data. The encryption/decryption unit 53 encrypts the data output by the device (the client device 10 or the server device 20) acquired via the communication unit 50. The encryption/decryption unit 53 decrypts the encrypted data acquired from the network NW acquired via the communication unit 50.

The storage unit 54 is, for example, a storage unit having the EEPROM 47 and includes a certificate information storage unit 55 and a secret information storage unit 56. The certificate information storage unit 55 stores a certificate for a device (the client device 10 or the server device 20) issued by the communication control management device 5. Specifically, information indicating the client certificate is stored in the certificate information storage unit 55 of the IC card 40 attached to the client-side communication control device 30. Information indicating the server certificate is stored in the certificate information storage unit 55 of the IC card 40 attached to the server-side communication control device 31.

The secret information storage unit 56 stores a secret key for the device (the client device 10 or the server device 20) issued by the communication control management device 5. Specifically, information indicating the secret key issued to the client-side communication control device 30 is stored in the secret information storage unit 56 of the IC card 40 attached to the client-side communication control device 30. Information indicating the secret key issued to the server-side communication control device 31 is stored in the certificate information storage unit 55 of the IC card 40 attached to the server-side communication control device 31.

The IC card 40 is an example of a processing unit (authentication unit) for executing a part of the processing to be executed by the communication control device 30 (31). The processing to be executed by the IC card 40 described above may be implemented by the controller 33, a processing circuit provided separately, or the like. That is, the communication control device 30 (31) is not limited to a device including the IC card 40 functioning as the authentication unit, but may be a device in which the controller 33, a processing circuit, or the like implements processing such as a mutual authentication process, encryption or decryption process, etc.

Figure 6:
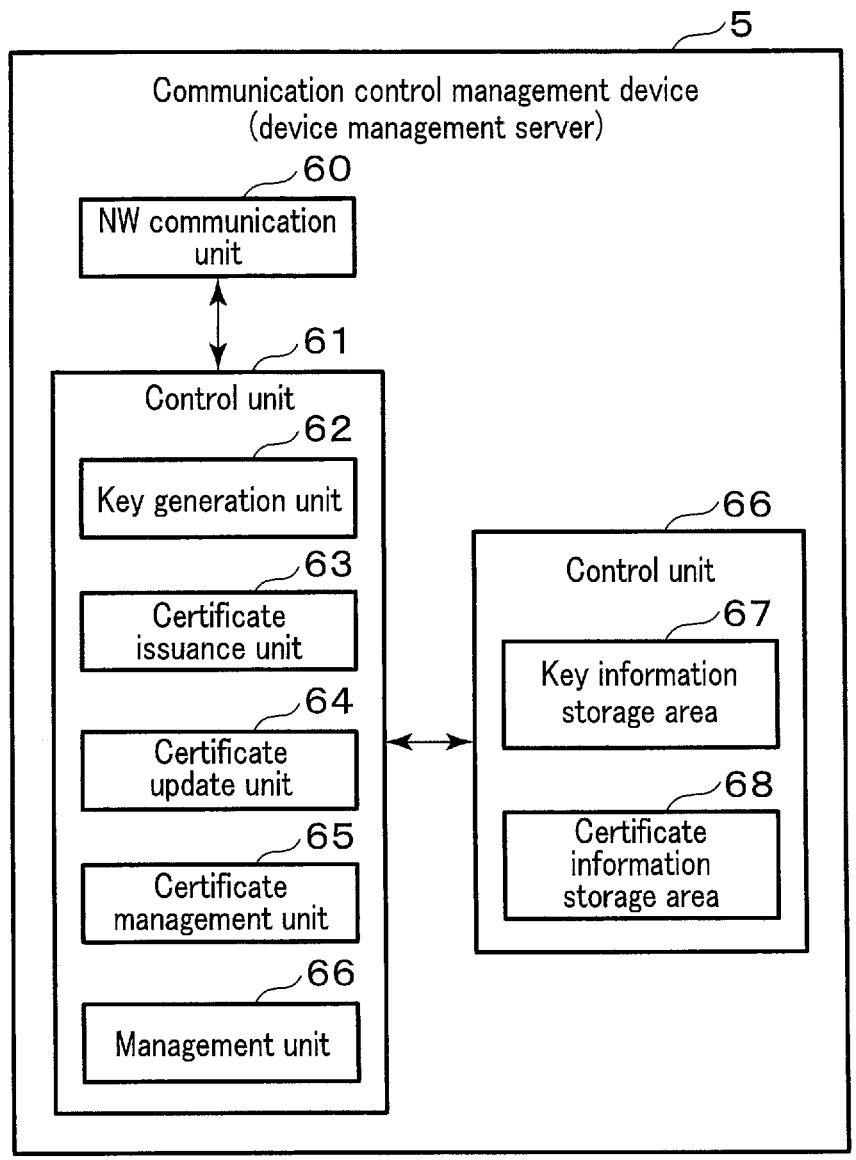
FIG. 6 is a block diagram showing an example of a functional configuration of a communication control management device according to an embodiment.

Here, the configuration of the communication control management device 5 will be described with reference to FIG. 6. FIG. 6 is a block diagram showing a configuration example of the communication control management device 5 shown in FIG. 1. The communication control management device 5 includes, for example, a network (NW) communication unit 60, a control unit 61, and a storage unit 66.

The NW communication unit 60 is connected to the network NW and communicates with the communication control device 30 (31) via the network NW.

The control unit 61 includes, for example, a processor such as a CPU. The control unit 61 implements various processes by the processor executing a program. The control unit 61 generally controls the communication control management device 5. The control unit 61 mainly operates as a private authentication authority that recognizes the validity of the communication control device 30 (31). In the example shown in FIG. 6, the control unit 61 executes processing for implementing functions as a key generation unit 62, a certificate issuance unit 63, a certificate update unit 64, a certificate management unit 65, and a management unit 69 by the processor executing a program.

For example, the key generation unit 62 issues a secret key corresponding to a public key included in a certificate to be described later on the basis of an authentication request from the communication control device 30 (31).

For example, the certificate issuance unit 63 issues a certificate that recognizes the validity of the communication control device 30 (31) on the basis of the authentication request from the communication control device 30 (31). The certificate includes a public key and information indicating an owner of the communication control device 30 (31).

The certificate update unit 64 updates the certificate by setting a new validity period for the certificate whose validity period has expired. The certificate update unit 64 issues, for example, a certificate in which the validity period of the certificate issued to the communication control device 30 (31) is extended on the basis of an update request from the communication control device 30 (31) and transmits the issued certificate to the communication control device 30 (31). Information indicating the issued certificate is received by the communication control device 30 (31) and stored in the certificate information storage unit 405 of the IC card 40 of the communication control device 30 (31), so that the validity period of the certificate of the communication control device 30 (31) is extended.

The certificate management unit 65 manages certificates that have already been issued. For example, the certificate management unit 65 performs a process of invalidating the certificate issued to the communication control device 30 (31) when validity in mutual authentication has not been mutually proved due to falsification, theft, or the like of the IC card 40 attached to the communication control device 30 (31). The certificate management unit 65 may be configured to respond regarding whether or not certificates issued to the communication control device 30 (31) and other communication devices have been issued by the certificate management unit 65 on the basis of an inquiry from the communication control device 30 (31). The certificate management unit 65 may be configured to periodically check whether the issued certificate is being used in the valid communication control device 30 (31).

The management unit 69 manages the communication control device 30 (31). For example, the management unit 69 remotely controls the mutual authentication to be performed by the communication control device 30 (31) via the network NW.

The storage unit 66 includes, for example, a key information storage area 67 and a certificate information storage area 68. The key information storage area 67 stores, for example, information indicating a public key or a secret key that has already been issued. The certificate information storage area 68 stores, for example, information indicating a certificate that has already been issued. The key information storage area 67 and the certificate information storage area 68 are referred to, for example, when the key generation unit 62 issues a secret key, when the certificate issuance unit 63 issues a certificate, or the like. The key information storage area 67 stores information indicating the secret key issued by the key generation unit 62'. The certificate information storage area 68 stores information indicating the certificate issued by the certificate issuance unit 63.

Next, a flow of a process in the case of transmitting data from the client device 10 to the server device 20 in the communication system 1 according to the embodiment will be described.

Figure 7:
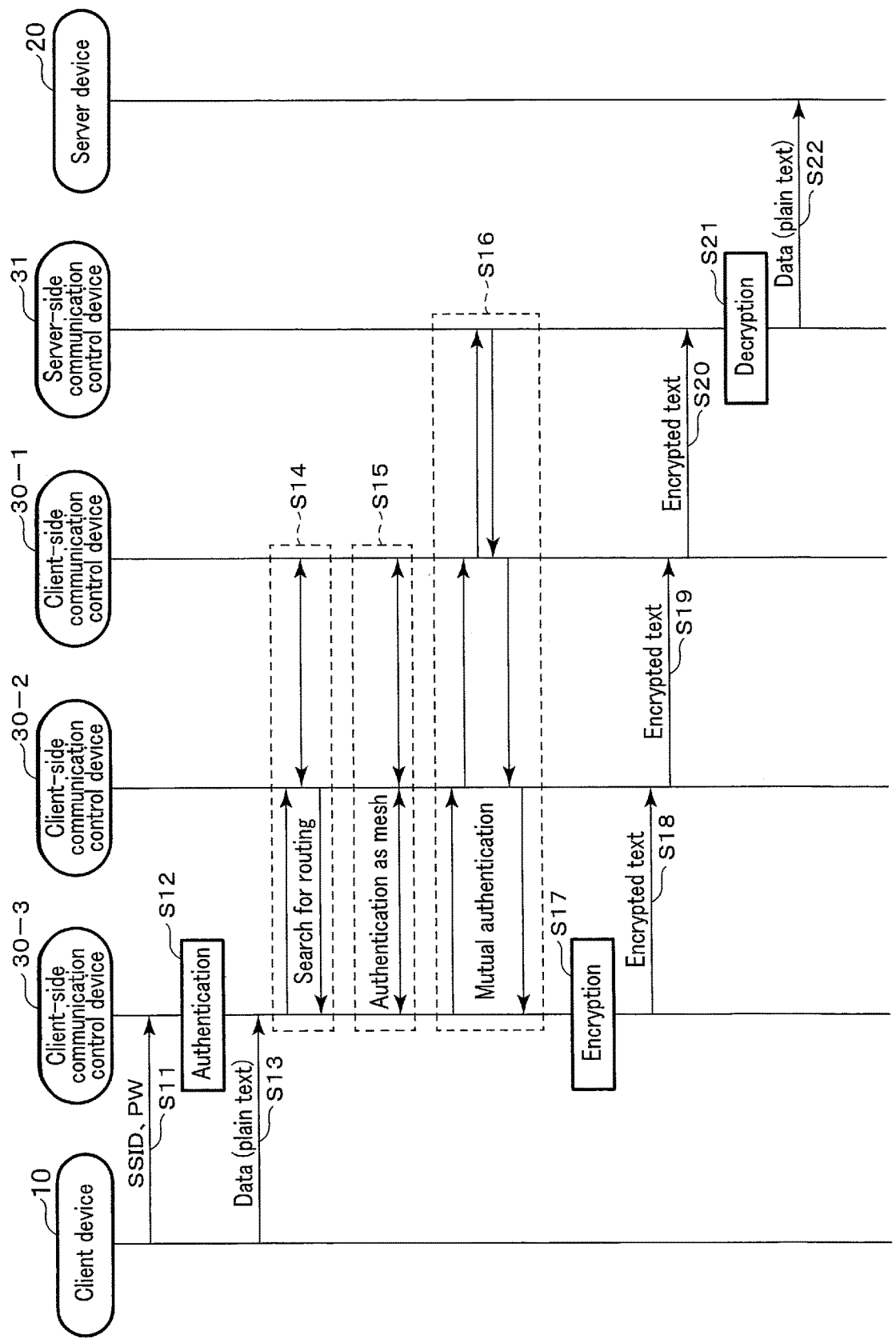
FIG. 7 is a sequence chart showing a process example of data transmission from a client device to a server device of a communication system according to an embodiment.

FIG. 7 is a sequence chart showing an example of the data transmission from the client device 10 to the server device 20 in the communication system 1 according to the embodiment.

When transmitting data such as imaging data to the server device 20, the client device 10 transmits its own device-specific information to the client-side communication control device 30 in the wireless communication area (step S11). For example, the client device 10 transmits device-specific information, such as a protocol of a data link layer, such as WPA2, or an MAC address, thereby requesting the client-side communication control device 30 to perform authentication. Here, as shown in FIG. 7, it is assumed that the client device 10 transmits an SSID and a password (PW), as the device-specific information, to the communication control device 30-3 of the communication control devices 30 constituting the mesh network 8. The device-specific information transmitted by the client device 10 is acquired by the client-side communication control device 30-3.

Upon receipt of the device-specific information transmitted from the client device 10, the controller 33 of the client-side communication control device 30-3 authenticates the validity of the device based on the received device-specific information (step S12). For example, the controller 33 authenticates the validity of the client device 10 corresponding to the received device-specific information based on the white list retained in the data memory 104.

Accordingly, each client-side communication control device 30 can discard communications outside of those from valid system components (devices indicated in the white list). By discarding the communication other than those of valid system components, even in the case of the communication control devices 30 that can wirelessly communicate with a number of devices, it is possible to prevent attacks stemming from large amounts of communication from unspecified devices. Furthermore, since each of the communication control devices 30 constituting the mesh network performs an authentication process, attacks from unauthorized devices can be dispersed and authentication process loads can be lower as compared to a system in which only a specified communication control device performs authentication.

If the authentication of the client device 10 is successful, the controller 33 receives data to be transmitted from the client device 10 to the server device 20. The client device 10 transmits data unencrypted based on mutual authentication (hereinafter referred to as plain text data) to the communication control device 30-3 that is a destination of the wireless communication. However, the data transmitted by the client device 10 to the communication control device 30-3 is protected by the data link layer, such as WPA2.

The controller 33 of the communication control device 30-3 executes a routing search to search for a route through which data is transmitted from the client device 10 to the server device 20 in the mesh network (step S14). The routing search is a process for searching for a communication path for transmission of data from the communication control device 30-3 to the communication control device 30-1 connected to the network NW.

A protocol utilizing reactive metrics determined from a wireless transmission rate, traffic, an amount of interference of an adjacent node (communication control device), such as RM-AODV, is adopted as a routing protocol. The wireless transmission rate includes a processing load state at that time. The routing search is executed each time communication occurs.

As the routing search is performed each time a data transmission request is received, the client device 10 can transmit data in the mesh network through an optimum path (for example, the highest-speed path) at each search time, and not through a fixed preset communication path, even when the same client device 10 is used. Furthermore, as the routing search is performed each time, even if one of the communication control devices constituting the mesh network goes down due to a malicious attack or trouble, a better path can be selected from the communication paths utilizing another available communication control device in the mesh network, so that redundancy can be realized. In the routing search, a search may be conducted for a communication path including any device other than the communication control devices, as long as the validity of the device is confirmed by a MAC address or the like.

When a communication path in the mesh network 8 is determined by the routing search, the controller 33 of the communication control device 30-3 performs authentication of each of the communication control devices 30 forming the communication path in the mesh network (step S15). The controller 33 performs mutual authentication among the communication control devices 30 forming the communication path in the mesh network, using the key and the certificate retained by each communication control device 30. As a result, a path can be formed by a group of the communication control devices in which the validity is confirmed in the mesh network, so that spoofing by a mesh network-compatible device or hijacking by a MITM attack can be prevented. If the communication path in the mesh network includes a device other than the communication control devices, the device other than the communication control devices may be authenticated by another authentication method, for example, use of a MAC address or the like.

If the mutual authentication between the communication control devices 30 in the communication path in the mesh network is successful, the controller 33 of the communication control device 30-3 executes mutual authentication with the server-side communication control device 31, utilizing a key and a certificate corresponding to the client device 10, as authentication in SLL/TLS (step S16).

For example, the client-side communication control device 30-3 transmits information indicating a TLS version and a list of encryption schemes or algorithms used for communication. The server-side communication control device 31 determines an encryption algorithm with respect to the client-side communication control device 30-3. The server-side communication control device 31 transmits information necessary for the common key for use in encrypted communication. For example, information necessary for the common key includes information indicating the public key issued to the server device 20 and its certificate, and information for requesting the client device 10 to transmit the corresponding key and its certificate. The client-side communication control device 30-3 transmits information necessary for the public key issued to its own device and its certificate and the common key for use in encrypted communication to the server-side communication control device 31.

For example, mutual authentication in communication between the client-side communication control device 30-3 and the server-side communication control device 31 is performed as follows. The client-side communication control device 30-3 generates a signature and transmits the signature to the server-side communication control device 31. The server-side communication control device 31 verifies the signature received from the client-side communication control device 30 on the basis of the certificate received from the client-side communication control device 30. If verification is successful, the server-side communication control device 31 determines that the certificate is a certificate of the client-side communication control device 30. The server-side communication control device 31 generates a signature and transmits the signature to the client-side communication control device 30. The client-side communication control device 30-3 verifies the signature received from the server-side communication control device 31 based on the certificate received from the server-side communication control device 31. If the verification is successful, the client-side communication control device 30-3 determines that the certificate is a certificate of the server-side communication control device 31.

When mutual authentication in communication between the client-side communication control device 30-3 and the server-side communication control device 31 is correctly performed, the client-side communication control device 30-3 and the server-side communication control device 31 exchange common keys for use in encryption and decryption.

After the mutual authentication in communication between the communication control device 30-3 and the server-side communication control device 31 succeeds, the controller 33 of the communication control device 30-3 encrypts data from the client device 10 based on a result of the mutual authentication with the server-side communication control device 31 (step S17). The controller 33 of the communication control device 30-3 transmits the encrypted data (encrypted text) in the mesh network 8 through a communication path set by the routing search (steps S18 and S19).

For example, the controller 33 of the communication control device 30 adds information indicating a communication path in the mesh network 8 to the encrypted data, and transmits the data to a next communication control device on the communication path. In the example shown in FIG. 7, the controller 33 of the communication control device 30-3 transmits the encrypted data to the communication control device 30-2 (step S18), and the controller 33 of the communication control device 30-2 transmits the encrypted data from the communication control device 30-3 to the communication control device 30-1 (step S19). The controller 33 of the communication control device 30-1 connected to the network NW, at the end of the communication path in the mesh network 8, transmits the encrypted data transferred from the other communication control devices 30-2 and 30-3 in the mesh network to the server-side communication control device 31 via the network. NW (step S20). The controller 33 of the server-side communication control device 31 decrypts the encrypted data received from the client-side communication control device 30 on the basis of the result of the mutual authentication with the client-side communication control device 30-3 (step S21). For example, the controller 33 of the server-side communication control device 31 decrypts the encrypted data from the client device 10 using the public key obtained through the mutual authentication, and transmits the decrypted data to the server device 20 (step S22). Thus, the data transmission process from the client device 10 to the server device 20 is completed.

If the mutual authentication between the communication control device 30-3 and the server-side communication control device 31 through the mesh network and the network NW is successful, communication processing including encryption based on the mutual authentication can be realized. Accordingly, the data transmitted from the client device 10 is protected by the data link layer, such as WPA2, until the client-side communication control device 3-3 near (in the communication area of) the client device 10 which is a data transmission source. Thereafter, the data is transmitted with secret communication authenticated by SSL/TLS in the subsequent communication path (in the mesh network and the network NW). As a result, the communication system according to the present embodiment ensures not only the security in the network NW but also the security of data transmitted in the mesh network.

Next, a process flow for transmission of data from a server device to a client device of the communication system 1 according to the embodiment will be described.

Figure 8:
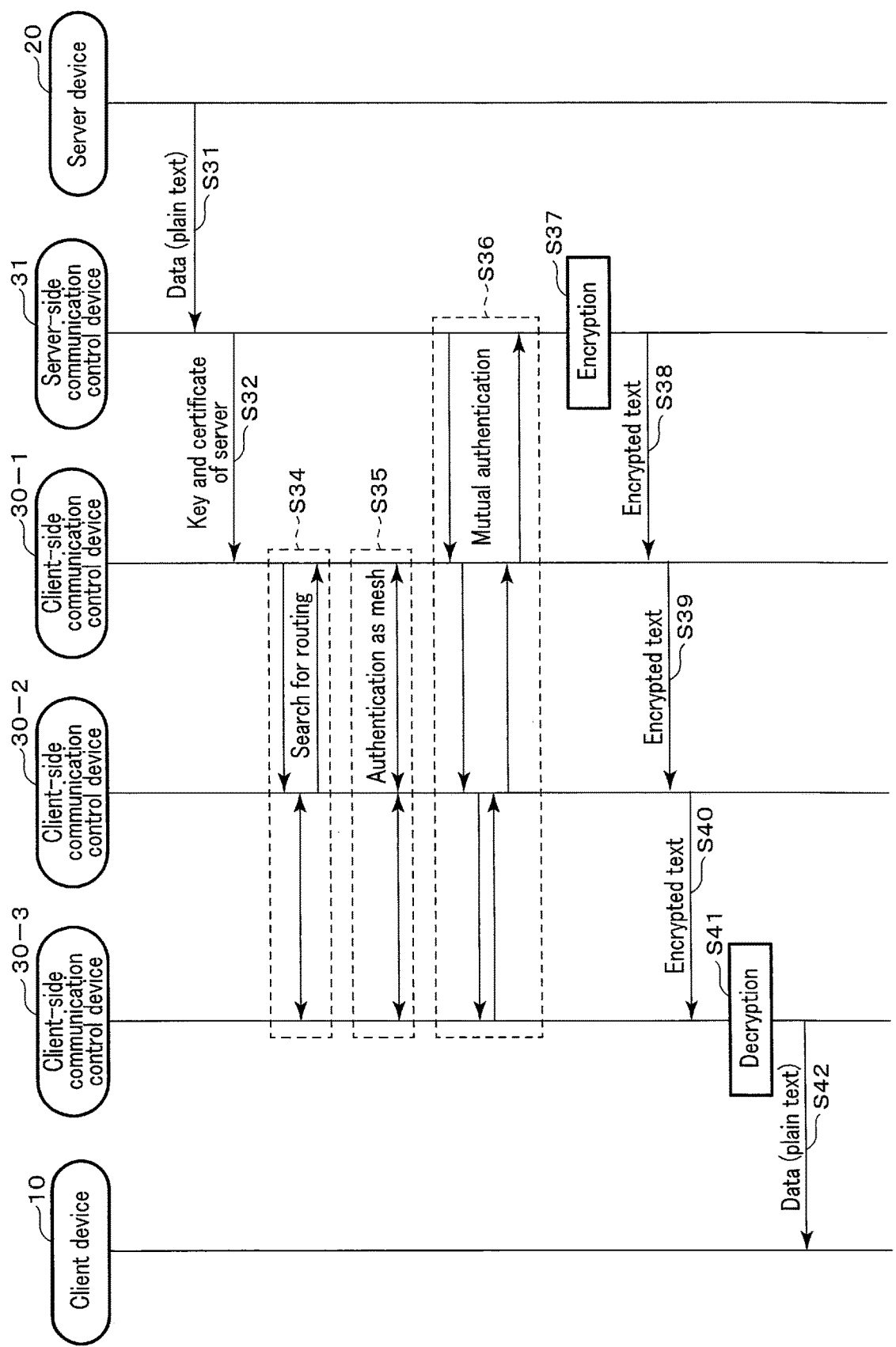
FIG. 8 is a sequence chart showing a process example of data transmission from a server device to a client device of the communication system according to an embodiment.

FIG. 8 is a sequence chart showing an example of the data transmission from the server device 20 to the client device 10 in the communication system 1 according to the embodiment.

The server device 20 may transmit a command or software update data to the client device 10. When transmitting data to the client device 10, the server device 20 additionally transmits identification information indicating the destination client device 10 to the server-side communication control device 31 (step S31).

Upon receipt of the data from the server device 20 to be addressed to the client device, the controller 33 of the server-side communication control device 31 transmits a request for authentication in SLL/TLS based on the key corresponding to the server device 20 and its certificate to the client-side communication control device 30-1 (step S32).

The controller 33 of the client-side communication control device 30-1 executes a routing search to search for a route through which data is transmitted from the network NW to the client device 10 of the destination in the mesh network (step S34). If the communication control device 30-1 is connected to the network NW and the communication control device 30-3 wirelessly communicates with the destination client device 10, the controller 33 of the client-side communication control device 30-1 searches for a communication path for transmission of data from the communication control device 30-1 to the communication control device 30-3 as a routing search in the mesh network 8.

The routing search is carried out in accordance with the routing protocol described above, and determined on the basis of a state of the processing load when a data transmission request is received. As the routing search is performed each time a data transmission request is received, it is possible to determine an optimum communication path (for example, the highest-speed path) in accordance with the state of the processing load. Furthermore, as the routing search is performed each time, even if one of the communication control devices goes down due a malicious attack or trouble, a better path can be selected from the communication paths utilizing another available communication control device in the mesh network so that redundancy can be realized. In the routing search, a communication path including any device other than the communication control device 30 may be searched, as long as the validity of the device is confirmed.

When a communication path in the mesh network 8 is determined by the routing search, the controller 33 of the communication control device 30-1 performs simultaneous authentication of the communication control devices 30 forming the communication path in the mesh network (step S35). The controller 33 performs mutual authentication among the communication control devices 30 forming the communication path in the mesh network 8, using the key and the certificate retained by each communication control device 30. As a result, a communication path can be formed by a group of the communication control devices in which the validity is confirmed in the mesh network, so that spoofing by a mesh network-compatible device or hijacking by MITM attack can be prevented. If the communication path in the mesh network includes a device other than the communication control devices, the device other than the communication control devices may be authenticated by another authentication method, for example, using a MAC address or the like.

If the mutual authentication between the communication control devices 30 in the communication path in the mesh network succeeds, the controller 33 of the communication control device 30-3 at the end of the communication path (the communication control device wirelessly communicating with the client device 10 of the destination) executes mutual authentication with the server-side communication control device 31 as authentication in SLL/TLS (step S36). The mutual authentication in communication between the client-side communication control device 30-3 and the server-side communication control device 31 is performed in the manner described above. When the mutual authentication is correctly performed, the client-side communication control device 30-3 and the server-side communication control device 31 exchange common keys for use in encryption and decryption.

After the mutual authentication in communication between the communication control device 30-3 and the server-side communication control device 31 succeeds, the controller 33 of the server-side communication control device 31 encrypts data from the server device 20 to the client device 10, using the common key obtained through the mutual authentication (step S37). The controller 33 of the communication control device 31 transmits the encrypted data (encrypted text) to the client-side communication control device 30-1 via the network NW (step S38).

The controller 33 of the client-side communication control device 30-1 transmits the encrypted data acquired via the network NW from the server-side communication control device 31 in the mesh network 8 through a communication path set by the routing search (steps S39 and S40). To clearly indicate the communication control device at the end of a communication path, the controller 33 of the client-side communication control device 30-1 adds information indicating a communication path in the mesh network 8 (or information indicating a communication control device at the end of the communication path) to the encrypted data, and transmits it through the communication path.

In the example shown in FIG. 8, the controller 33 of the client-side communication control device 30-1 transmits data, in which the information indicating the communication path is added to the encrypted data (encrypted text), to the communication control device 30-2 (step S39), and the controller 33 of the communication control device 30-2 transfers the data from the communication control device 30-1 to the communication control device 30-3 (step S40).

The controller 33 of the communication control device 30-3 in direct wireless communication with the client device 10, at the end of the communication path in the mesh network 8, determines itself as the end of the communication path based on the data added to the encrypted data transferred from the other communication control devices 30-1 and 30-2 in the mesh network 8, and decrypts the received encrypted data using the common key obtained through the mutual authentication with the server-side communication control device 31 (step S41). The controller 33 of the communication control device 30-3 transmits the decrypted data to the client device 10 via the wireless communication unit (step S42). The data transmission process from the server device 20 to the client device 10 is thus completed.

Through the process described above, the data can also be securely transmitted from the server device 20 to the client device 10 in the network NW and the mesh network, and in an encrypted state, using the result of mutual authentication between the communication control device 30-3 and the server-side communication control device 31. As a result, the communication system according to the present embodiment ensures the security of both the network NW and the data transmitted in the mesh network with regard to data transmitted between the client device 10 and the server device 20.

When the mutual authentication between the client-side communication control device 30-3 and the server-side communication control device 31 has not been correctly performed, the client-side communication control device 30-3 does not permit communication with the communication destination. Specifically, the client-side communication control device 30-3 does not output the information transmitted from the communication destination to the client device 10. This is because, when the mutual authentication has not been correctly performed, there is a possibility that the communication destination will be an unauthorized communication device pretending to be the server-side communication control device 31. In this case, for example, the client-side communication control device 30-3 may be configured to transmit a communication record when the mutual authentication has not been correctly performed to the communication control management device 5. Accordingly, the communication control management device 5 can acquire a communication record when the mutual authentication has not been correctly performed, and monitor abnormalities of a network by ascertaining a pattern or frequency of unauthorized communication with the client-side communication control device 30-3 under management.

The client-side communication control device 30-3 may be configured to determine whether or not to permit communication with the communication destination on the basis of a transmission destination list indicating information of communication equipment with which the client device 10 is permitted to perform communication instead of mutual authentication. The information of communication equipment indicated in the transmission destination list is, for example, a uniform resource locator (URL). The controller 33 of the client-side communication control device 30 permits communication with the communication destination when the URL of the communication destination is a URL registered in the transmission destination list and does not permit communication when the URL of the communication destination is not registered in the transmission destination list.

The controller 33 may be configured to update the transmission destination list. For example, the controller 33 causes a URL of a communication destination permitted to communicate with the client device 10 for a fixed period and a URL of a communication destination which is not permitted to communicate with the client device 10 to be stored. Then, for example, the controller 33 updates the transmission destination list by re-registering a URL of a communication destination with which communication has been performed for a fixed period among the URLs registered in the transmission destination list and the like. Alternatively, the client-side communication control device 30 may be configured to transmit a communication destination URL for which communication is permitted for a fixed period and a communication destination URL for which no communication is permitted to the communication control management device 5. In this case, for example, the communication control management device 5 may be configured to update the transmission destination list on the basis of the communication destination URL that communicates with the client-side communication control device 30. By updating the transmission destination list in the communication control management device 5, communication equipment that communicates with the client-side communication control device 30 under the management of the communication control management device 5 can be collectively managed.

The client-side communication control device 30 may be configured to verify whether or not details of information (for example, an update program of firmware) transmitted to the client device 10 after the mutual authentication with the server-side communication control device 31 is established are correct. For example, when the update program of firmware of the client device 10 has been transmitted via the network NW, the controller 33 of the client-side communication control device 30 performs verification using a key for verification (verification key). In this case, for example, the communication control management device 5 may be configured to transmit the verification key to each of the client-side communication control device 30 and the server-side communication control device 31.

For example, the server-side communication control device 31 generates a hash value from information (plain text) that is transmitted to the client device 10 and encrypts the generated hash value with a verification key. Then, the server-side communication control device 31 further encrypts the plain text and the encrypted hash value with a secret key and transmits an encryption result to the client device 10. The client-side communication control device 30 decrypts information using the common key and acquires the plain text and the encrypted hash value.

The client-side communication control device 30 generates a hash value from the acquired plain text and decrypts the encrypted hash value with the verification key. When the hash value generated from the plain text and the decrypted hash value are equal, the client-side communication control device 30 determines that the information transmitted to the client device 10 are correct details. In this case, the client-side communication control device 30 outputs the decrypted information (plain text) to the client device 10. On the other hand, when the hash value generated from the plain text and the decrypted hash value are not equal, the client-side communication control device 30 determines that there is a possibility that information transmitted to the client device 10 may be unauthorized information transmitted from an unauthorized communication device pretending to be the server device 20 or the server-side communication control device 31. In this case, the client-side communication control device 30 does not output the decrypted information (plain text) to the client device 10.

As a result, the client device 10 can receive only information verified to be verified correct details. Normally, the client device 10 generally determines whether or not details of the update program are correct when the firmware is updated. However, since the server-side communication control device 31, instead of the client device 10, verifies details of the information transmitted to the client device 10, it is possible to reduce the processing load of the client device 10.

As described above, the communication system 1 includes the client-side communication control devices 30 constituting the mesh network connected between the client device 10 and the network NW and the server-side communication control device 31 connected between the server device 20 and the network NW. The client-side communication control device 30-3 in direct wireless communication with the client device 10 determines a communication path in the mesh network, encrypts information from the client device 10, and transmits it to the server-side communication control device 31 via the communication path in the mesh network and the network NW. The information from the network NW (the information from the server device 20 encrypted by the communication control device 31) is transmitted via the mesh network through the communication path searched by the client-side communication control device 30-1 connected to the network NW. The communication control device 30-3 at the end of the communication path in the mesh network (the communication control device 30-3 wirelessly communicating directly with the client device 10) decrypts the information, and transmits it to the client device 10. The server-side communication control device 31 encrypts information from the server device 20, transmits it to the client-side communication control device 30 via the network NW, decrypts information from the network NW (information from the client device encrypted by the communication control device 30), and transmits it to the server device 20.

Accordingly, the communication system 1 can improve the security of the social infrastructure system without changing the social infrastructure system. This is because imaging data (so-called plain text) of an HTTP protocol transmitted from the client device 10 to the server device 20 is combined with, for example, the SSL/TLS protocol, by the client-side communication control device 30 wirelessly communicating directly with the client device, and is replaced with imaging data of HTTPS in which security is improved. Further, the control data transmitted from the server device 20 to the client device 10 is encrypted, but is decrypted by the client-side communication control device 30 and received by the client device 10. Therefore, it is unnecessary to cause the client device 10 to perform a decryption process and an existing device can be used as it is without any change.

In the communication system 1, because the client-side communication control device 30 and the server-side communication control device 31 perform mutual authentication, security can be improved as compared with a case in which authentication is performed only in one direction. In general client terminals and a server device, an unspecified number of client terminals communicate with the server device; therefore, it is not practical to issue and continuously manage valid client certificates with respect to the unspecified number of client terminals. However, in the social infrastructure system or the like to which a communication system is applied, a relationship between the client device 10 and the server device 20 is clearly specified. Thus, the client-side communication control device 30 and the server-side communication control device 31 can perform mutual authentication, and security can be improved.

In general, in a client terminal that does not have a client certificate, an ID or a password issued by the server device may be required to be input for communicating with the server device. In such password authentication, a long-text string in which characters and numbers are combined may be required with respect to the password, or periodic password changes and the like may be required, to maintain security. However, when the number of passwords to be remembered increases, management may become troublesome and passwords may leak in a case in which passwords are left in memos or are recorded in a web browser or the like.

In contrast, in the communication system 1, the client-side communication control device 30 has a client certificate, so that mutual authentication can be reliably performed in communication with the server device 20. Therefore, password authentication may be unnecessary. In this case, the effort and time for inputting a password and periodically changing and managing the password are eliminated and user convenience is improved. That is, security can be maintained without imposing a burden on the user.

When a client terminal that does not have a client certificate communicates with a server device on the basis of authentication of an ID or a password, anyone can communicate with the server device if the ID and the password can be correctly input. Therefore, it becomes possible to illegally hijack the client terminal and illegally access the server device. Thus, for example, there is a possibility that the function of the client terminal will be limited by the server device that has been illegally hijacked and that the terminal will be infected with ransomware for requesting a ransom for release.

In contrast, in the above-described communication system 1, the mutual authentication via the communication control device 30 (31) is performed between the client device 10 and the server device 20, so that the client device 10 and the server device 20 cannot be hijacked illegally. That is, in the communication system 1, a countermeasure against ransomware is also possible.

In addition, for example, when there is a terminal (also called a stray device) for which there is no manager within the network, the terminal may be used as an unauthorized terminal that performs an attack of malware or the like due to the unauthorized hijacking of the terminal. In contrast, in the above-described communication system 1, mutual authentication via the communication control device (31) is performed between the client device 10 and the server device 20. Thereby, even when a terminal for which there is no manager inside the network NW has been illegally hijacked and used in an attack, it is possible to prevent infection with malware or the like.

In the communication system 1 described above, the server device 20 is connected to the server-side communication control device 31 and no authentication process is performed inside the server device 20. Therefore, it is not necessary to hold a certificate or the like inside the server device 20 and it becomes clear that the server device 20 connected to the server-side communication control device 31 is under the management of the communication control management device 5. However, when the server device 20 already has a functional unit corresponding to the server-side communication control device 31, the server-side communication control device 31 is not necessarily required to be physically connected between the server device 20 and the network NW. In this case, an authentication process is performed in communication with the client-side communication control device 30 by a functional unit corresponding to the server-side communication control device 31 originally provided in the server device 20.

In the communication system 1, the control unit 51 of the IC card 40 causes at least one of a mutual authentication process and an encryption/decryption process to be performed. Thus, the device cost of the communication control device 30 (31) can be reduced An example in which the IC card 40 attached to the communication control device 30 (31) performs at least one of a mutual authentication process and an encryption/decryption process in the communication system 1 has been described. However, in the communication system 1, the configuration for performing the mutual authentication and the encryption/decryption process is not limited to the IC card. It suffices to use a functional unit having a storage function for storing a secret key and a client certificate (or a server certificate) and a processing function for performing at least one of a mutual authentication process and an encryption/decryption process as the IC card 40 described above. For example, the functional unit may be a SIM card equipped with an IC chip, and is not limited to a card form described above.

In the communication system 1, the IC card 40 of the client-side communication control device 30 is attached to the client-side communication control device 30 so that the IC card 40 can be attached to or detached from the client-side communication control device 30. Thus, in the communication system 1, because the IC card 40 and the client-side communication control device 30 can be separated, when either one is replaced, it is only necessary to replace the one device. For example, in a case where the IC card 40 and the client-side communication control device 30 are integrated, when a part corresponding to the IC card 40 is replaced, the entire client-side communication control device 30 must be replaced. However, as compared with this case, in the communication system 1, it is possible to reduce the maintenance cost when a specific part such as the IC card 40 included in the client-side communication control device 30 is replaced.

The communication system 1 further includes the communication control management device 5, and the communication control management device 5 transmits a secret key and a client certificate to be stored in the IC card 40 attached to the client-side communication control device 30 to the client-side communication control device 30, and transmits a secret key and a server certificate to be stored in the IC card 40 attached to the server-side communication control device 31 to the server-side communication control device 31. As a result, the communication system 1 can perform a handshake using the valid secret key and certificate issued by the communication control management device 5 to determine a common key, and can further improve the security of the social infrastructure system in addition to the effects described above.

The configuration of the communication system 1 is not limited to the example described above. For example, the communication control device 30 (31) may use a hardware security module (HSM) for implementing the function of the communication control device 30 (31) by hardware on the basis of the processing load. That is, the communication control device 30 (31) is not limited to the configuration in which the IC card is mounted as long as secure processing can be performed, and may be configured using an IC-chip or an IC-module capable of implementing the function of the communication control device 30 (31).

In the communication system 1, secure communication using the SSL/TLS protocol may be performed all the time or whether to perform communication using the SSL/TLS protocol may be selectable. Only the communication in one direction in the two-way communication between the client device 10 and the server device 20 may be set as communication using the SSL/TLS protocol. Secure communication using the SSL/TLS protocol may be performed all the time or whether to perform communication using the SSL/TLS protocol may be selectable.

By performing communication using the SSL/TLS protocol all the time, communication from a device different from the valid communication control device 30 (31) authenticated by the communication control device 30 (31) can be blocked. Thus, it is possible to prevent unauthorized access to the client device 10 or the server device 20 and infection of the client device 10 or the server device 20 with malware.

In the communication system 1, communication using the SSL/TLS protocol may be performed all the time and unauthorized access to the client device 10 or the server device 20 may be stored. In this case, a record of unauthorized access may be transmitted to the communication control management device 5. The communication control management device 5 can recognize the presence or absence of unauthorized access and can detect a sign stage and take a measure before a large-scale attack on the entire system is started.

In the communication system 1, the communication control device 30 (31) may periodically check whether or not a connection with the client device 10 or the server device 20 to which its own device is connected is maintained. In this case, information indicating the connection state may be transmitted to the communication control management device 5. In a case in which the information indicating the connection state cannot be received from the communication control device 30 (31) and the like, the communication control management device 5 determines that the communication control device 30 (31) is disconnected from the client device 10 or the server device 20 and invalidates the disconnected communication control device 30 (31). In this way, the communication control management device 5 prevents the disconnected communication control device 30 (31) from being connected to an unauthorized device and misused for evil purposes.

In the communication system 1, a chip with high tamper resistance called a secure element acquiring CC (common criteria/ISO 15408) authentication may be mounted on the IC card 40 attached to the communication control device 30 (31). By using this chip to store a certificate including a secret key and a public key, very high security can be maintained.

In the communication system 1, the program of the client device 10 may be configured to be updated from the server device 20, the communication control management device 5, or the like via the communication control device (31). It is possible to securely update the function of the client device 10 by performing the update of a program (the update of firmware) via the communication control device 30 (31). When the firmware is transmitted from the server device 20 to the client device 10 as described above, for example, a signature of the server device 20 encrypted by the server-side communication control device 31 is assigned to the firmware transmitted from the server device 20. In this case, the client device 10 can determine that the transmitted firmware is definitely the firmware transmitted from the server device 20 by decrypting the signature by means of the client-side communication control device 30. As a result, even if unauthorized firmware is transmitted to the client device 10 from an unauthorized terminal that pretends to be the server device 20, it is possible to eliminate erroneous update based on unauthorized firmware with respect to the client device 10.

In addition, by performing communication via the communication control device 30 (31) as described above, the firmware can be securely updated from the server device 20, the communication control management device 5, or the like to the client device 10. Therefore, work cost can be reduced as compared with a case in which a worker physically moves to a place where each client device 10 is installed with respect to a plurality of client devices 10 and performs a firmware update operation.

In the communication system 1, the client device 10 may be started or stopped from the server device 20, the communication control management device 5, or the like via the communication control device 30 (31). By performing the start and stop (remote activation) via the communication control device 30 (31), the function of the client device 10 can be updated securely and secure remote control can be implemented.

Although an example in which the client device 10 and the server device 20 communicate by wire in the communication system 1 has been described, the present invention is not limited thereto. At least one of the client device 10 and the server device 20 may be a device that performs wireless communication via a wireless LAN or the like. For example, when the client device 10 communicates with the server device 20 by wireless communication, the client-side communication control device 30 has a wireless communication function, encrypts data transmitted by the client device 10, and transmits the encrypted data to the server device 20 by wireless communication.

Although an example in which the client-side communication control device 30 communicates with the server-side communication control device 31 in the communication system 1 has been described, the communication destination of the client-side communication control device 30 is not limited thereto. For example, the client-side communication control device 30-1 may communicate with the client-side communication control device 30-2. When a communication start signal has been received from the client-side communication control device 30-2, the client-side communication control device 30-1 first performs mutual authentication in communication with the client-side communication control device 30-2 and checks that the client-side communication control device 30-2 is an authorized communication terminal. When the mutual authentication has been correctly performed, the client-side communication control device 30-1 outputs information received from the client-side communication control device 30-2 to the client device 10. By attaching an authenticator to transmission data using encryption, it becomes possible to detect falsification of communication information and to identify a transmitter. Therefore, in the communication system 1, in the communication between the client-side communication control device 30 and the server-side communication control device 31 and in the communication between the client-side communication control devices 30, it is possible to ensure that "data that has not been falsified is received from the correct partner".

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The embodiments and their modifications are covered by the accompanying claims and their equivalents, as would fall within the scope and gist of the inventions.

The invention claimed is:

1. A communication system comprising:
    a plurality of first communication control devices constituting a mesh network connected between a first device and a network communication network;
    a second communication control device connected between a second device and the network communication network; and
    a data memory storing a key and a certificate to indicate that each of the first communication control devices is authenticated,
    the first communication control devices each including:

a wireless communication unit configured to perform wireless communication; and a controller configured to, when receiving data to be transmitted via the wireless communication unit from the first device to the second device, determine a communication path in the mesh network to transmit the data to the network communication network from the first communication control device that receives the data, perform mutual authentication with the second communication control device communicating via the communication path and the network communication network, and thereafter transmit encrypted data obtained by encrypting the data to the second communication control device, wherein the controller of the first communication control device that receives the data from the first device encrypts the data to be transmitted from the first device to the second device using a common key determined by the mutual authentication with the second communication control device, the controller being configured to perform mutual authentication among the first communication control devices in the communication path based on the key and the certificate stored in the data memory, wherein when the communication path in the mesh network has been determined, the controller performs mutual authentication among the first communication control devices in the communication path, and communicates with the second communication control device via the communication path and the network communication network, after the mutual authentication among the first communication control devices in the communication path succeeds; wherein the controller acquires device-specific information from the first device via the wireless communication unit, and receives the data to be transmitted from the first device to the second device, after authentication with the device-specific information succeeds.

2. A communication system comprising:

a plurality of first communication control devices constituting a mesh network connected between a first device and a network communication network;

a second communication control device connected between a second device and the network communication network; and a data memory storing a key and a certificate to indicate that each of the first communication control devices is authenticated, the first communication control devices each including:

a wireless communication unit configured to perform wireless communication; and a controller configured to, when receiving encrypted data obtained by encrypting data to be transmitted from the second device to the first device, from the second communication control device, determine a communication path in the mesh network to transmit the data to the first device from the first communication control device that receives the encrypted data, perform mutual authentication between one of the first communication control devices at an end of the communication path and the second communication control device, and thereafter transmit the encrypted data acquired from the second communication control device via the network communication network to the first communication control device, wherein the controller of the first communication control device at the end of the communication path decrypts the encrypted data using a common key determined by mutual authentication with the second communication control device, and transmits the decrypted data to the first device, the controller being configured to perform mutual authentication among the first communication control devices in the communication path based on the key and the certificate stored in the data memory, wherein when the communication path in the mesh network has been determined, the controller performs mutual authentication among the first communication control devices in the communication path, and performs communication via the communication path, after the mutual authentication among the first communication control devices in the communication path succeeds; wherein the controller acquires device-specific information from the first device via the wireless communication unit, and receives the data to be transmitted from the first device to the second device, after authentication with the device-specific information succeeds.

* * * * *